United States Patent Office 3,511,684
Patented May 12, 1970

3,511,684
METHOD OF TREATING POLYMERIC RESIN TO DISPLAY NONTHROMBOGENICITY
Dennis Lloyd Huffaker, Waukegan, Ill., assignor to Abbott Laboratories, North Chicago, Ill., a corporation of Illinois
No Drawing. Filed May 17, 1967, Ser. No. 639,009
Int. Cl. B44d *1/092;* A61f *1/00*
U.S. Cl. 117—47                                1 Claim

ABSTRACT OF THE DISCLOSURE

This invention is directed to a method of treating polymeric resin material such that the resin material is rendered nonthrombogenic when in intimate contact with the blood of warm-blooded animals. The method comprises first contacting the resin material with a concentrated acid for a period of time followed by treatment with a solution of an anticoagulant.

BACKGROUND OF INVENTION

The blood of warm-blooded animals is unique in that it contains the chemical mechanism to form thrombi or blood clots when exposed to foreign substances. Although this mechanism is a necessary feature of life balance, there are several situations wherein foreign substances must be implanted in direct proximity with the circulatory system of such animals to help support the free form of blood. Generally, the materials used to formulate these prosthetic devices are thrombogenic and they must therefor be treated with anticoagulants to prevent clot formations.

Various attempts have been made to find a suitable material which exhibits nonthrombogenic properties or a method of treating known materials to render them nonthrombogenic when implanted in live tissue in intimate contact with blood. Of course, a suitable material for this purpose must exhibit other properties such as nontoxicity, flexibility, nonirritability, chemical stability, sterilizability, and ease of fabrication. Rubber, plastics and other polymeric resins, while exhibiting these other necessary properties, are generally thrombogenic and therefore require the use of anticoagulants concomitantly with their use as prosthetic implants.

Recently, various rubber and plastic materials have been coated with an anticoagulant such that the blood contacting this material contacts only a surface coating of anticoagulant thereby preventing thrombic formations. This coating technique is accomplished by first coating the material with a layer of graphite, followed by treatment with a quaternary ammonium salt such as benzalkonium chloride. The quaternary salt is able to act as a binding site for the anticoagulant thereby providing a surface coating of anticoagulant. Although this material has displayed a fair degree of nonthrombogenicity, certain problems still exist. For example, this coated material lacks flexibility making it difficult to fabricate into the desired shapes and forms necessary for prosthetic devices. Furthermore, the flow of blood over the coated surface eventually washes away the anticoagulant coating exposing the undercoating to the blood causing thrombi to form.

The object of this invention is to provide a simple and efficient method of treating polymeric resin material whereby the resin material is rendered nonthrombogenic to the blood of warm-blooded animals for prolonged periods of time.

DESCRIPTION OF INVENTION

In general, the method of this invention involves the treatment of a polymeric resin with, first, a concentrated acid which is capable of rendering the resin material hydrophilic followed by treatment with a solution of an anticoagulant. The resulting treated material is then in condition for implantation in live tissue in direct proximity to blood and exhibits nonthrombogenic properties for prolonged periods of time when contacted by blood.

The first step requires the treatment of the polymeric resin with a concentrated acid. This type of treatment is very surprising and unusual in view of the fact that medical grade devices are not usually subjected to such reagents. Although the precise mechanism of this method is not clearly understood, nor is it intended to rely upon any particular theory to explain this mechanism, it is believed that by immersing and soaking the resin material in a concentrated acid, the bond structure of the polymer is disrupted and altered in such a manner as to cause the polymer to become hydrophilic. When the polymeric resin is subsequently immersed and soaked in a solution of anticoagulant, the solvent is attracted by the hydrophilous polymer and is drawn into the material. The uptake of solvent necessarily includes the uptake of the anticoagulant which in turn becomes bonded or is otherwise trapped by the polymer structure. In addition, the anticoagulant solution has a washing and diluting effect on the acid residue adhering to the resin, thus the material may be withdrawn from the anticoagulant solution and placed directly in contact with live tissue without any deleterious effects.

The acid treatment may be carried out with any concentrated or semi-concentrated organic or inorganic acid. By the expression "semiconcentrated" is meant an acid having a molar concentration of no less than 5 molar, while the word "concentrated" is meant to denote an acid at its highest molar concentration. For example, hydrochloric acid is concentrated at 12 molar whereas nitric acid is a concentrated acid at 17 molar. Although acids having a concentration of below 5 molar may be employed in this method, best results are obtained with acids having a concentration of at least 5 molar. Examples of the acids which may be successfully utilized include hydrochloric, nitric, sulfuric, hydrochlorous, chlorous, chloric, perchloric, sulfurous, phosphoric, acetic, propionic, butyric and stearic, among other inorganic and organic acids.

The acid treatment is carried out by merely immersing and soaking the polymeric resin in an acid bath for a period of time. Generally, the acid treatment must continue for at least 2 hours to enable sufficient time for the resin to be rendered hydrophilic and a time period of from about 2 to about 12 hours is preferred. Where sulfuric acid is utilized, the acid treatment should be limited to no more than 4 hours since prolonged treatment results in degradation of the resin material.

Following the acid bath, the polymeric resin is subjected to a bath treatment with a solution of an anticoagulant. Any anticoagulant which may be used with the blood of warm-blooded animals is suitable in this method, including heparin compounds, such as heparin sodium, coumarin compounds such as dicoumarol and indandion derivatives, such as warfarin. The anticoagulant solution may be provided as a 1% to 20% solution of an anticoagulant in distilled water or saline. The precise concentration level of anticoagulant in solution is not critical except that sufficient anticoagulant must be present to penetrate and permeate the resin material to render same nonthrombogenic. Similarly, the length of time of the anticoagulant bath is not critical except that sufficient time must be allowed to enable substantial penetration of the anticoagulant into the resin. Generally, a period of 2 hours is sufficient to cause substantial permeation, although it is preferable to allow the resin material to soak until just prior to actual use of the resin.

Hence, there is no upper limit to the time period for the anticoagulant bath.

This method is preferably utilized in connection with polymeric resin material which has been previously molded into the desired prosthetic device. For example, if the goal is to obtain nonthrombogenic catheter tubing, the resin material should first be extruded into tubing of the dimensions desired, and then subjected to the acid and anticoagulant treatment of this novel method. In this manner, it is assured that the molding operation, which usually requires high temperatures, does not interfere with and destroy the resin-anticoagulant mesh which is produced by this process. Furthermore, as a matter of convenience, the particular prosthetic device to be used may be acid treated and then allowed to sit in the anticoagulant bath until used thereby further assuring the nonthrombogenicity of the device prior to surgery.

Several variations of this novel method are possible. For example, the acid treatment and anticoagulant treatment may be combined into one operation. That is, the anticoagulant solution may be combined with the concentrated acid whereby the resin material is subjected to but a single bath. So long as the acid employed is compatible with the particular anticoagulant utilized, a single bath solution may be used. In addition, a combination of acids may be used for the acid treatment rather than a single acid. For example, the acid bath may be comprised of 1 part concentrated nitric acid and 3 parts concentrated hydrochloric acid.

The following examples are presented to illustrate a few specific embodiments of this novel method and are not intended to limit the scope thereof.

EXAMPLE 1

A 12-inch length of polyvinyl chloride tubing approximately 0.100 inch inner diameter by 0.130 inch outer diameter is immersed in a bath of 12 molar hydrochloric acid for a period of 8 hours. Following removal from the acid bath, the tubing is immersed in a 10% solution of heparin sodium in saline water, and allowed to soak for 8 hours.

The tubing is tested in vivo using a jugular vein of a dog. The jugular vein is exposed and severed in a standard surgical manner. The tubing is formed into a loop and to each end of the jugular vein is attached one end of the tubing. Circulation through the vein is resumed with blood now passing through the tubing.

After 10 hours, blood flow is normal and no clot formation is detected.

EXAMPLE 2

A 12-inch length of polytetrafluoroethylene tubing 0.100 inch by 0.130 inch is immersed in a bath of 12 molar hydrochloric acid for a period of 6 hours. Following removal from the acid bath, the tubing is immersed and soaked in a solution of 10% heparin sodium in saline water for 12 hours.

Following removal from the heparin solution, the tubing is tested in vivo according to the procedure of Example 1. After 10 hours, no decrease in blood flow is detected and no clot formations are present.

EXAMPLE 3

A 12-inch length of polyvinyl chloride tubing 0.100 inch by 0.130 inch is immersed in a bath of 17 molar nitric acid for 12 hours, followed by immersion in a solution of 10% heparin sodium in distilled water for 24 hours.

In vivo testing of the tubing shows blood flow normal and no clot formations after 10 hours of dwelling time.

EXAMPLE 4

Another 12-inch length of tubing as in Example 3 is immersed in a solution consisting of 1 part 12 molar hydrochloric acid and 1 part 10% heparin sodium in saline. The tubing is soaked for 8 hours and dried at room temperature.

In vivo testing of this tubing shows no decrease in blood flow after 4 hours of dwelling time and no clot formations.

Similar results may be obtained when using other polymeric resins such as polyethylene, polypropylene among others, and when employing other anticoagulants such as dicoumarol and warfarin.

I claim:

1. A method of rendering polymeric resins nonthrombogenic to the blood of warm-blooded animals comprising the steps of treating a polymeric resin selected from the group consisting of polyvinylchloride, polytetrafluoroethylene, polyethylene and polypropylene with an aqueous solution of an acid selected from the group consisting of hydrochloric, nitric, sulfuric, hydrochlorous, chlorous, chloric, perchloric, sulfurous, phosphoric, acetic, propionic, butyric and combinations thereof, having a concentration equal to at least 5 molar for a period of two to fourteen hours to render said resin hydrophilic and penetrable by an aqueous solution of anticoagulant but not to degrade the resin and permeating the acid-treated resin with an aqueous solution of anticoagulant for a time sufficient to render the resin nonthrombogenic.

References Cited

UNITED STATES PATENTS

| | | | |
|---|---|---|---|
| 3,235,426 | 2/1966 | Bruner | 117—47 |
| 3,279,996 | 10/1966 | Long et al. | 3—1 |
| 3,314,743 | 4/1967 | Gagliardi | 117—47 |
| 3,317,339 | 5/1967 | Fortner et al. | 117—47 |

MURRAY KATZ, Primary Examiner

U.S. Cl. X.R.

3—1; 117—138.8; 128—334